United States Patent [19]

Iketani

[11] Patent Number: 4,920,307
[45] Date of Patent: Apr. 24, 1990

[54] ELECTRIC POWER SOURCE USED TO CHARGE A SECONDARY POWER SOURCE

[75] Inventor: Kohei Iketani, Tokyo, Japan

[73] Assignee: Asahi Kogaku Kogyo Kabushiki Kaisha, Tokyo, Japan

[21] Appl. No.: 378,874

[22] Filed: Jul. 12, 1989

[30] Foreign Application Priority Data

Jul. 19, 1988 [JP] Japan .................. 63-179750

[51] Int. Cl.$^5$ ............................................ H02J 7/00
[52] U.S. Cl. .................................. 320/28; 320/29; 320/40; 320/47; 307/48; 307/86; 363/89
[58] Field of Search ................. 320/27, 28, 29, 32, 320/33, 39, 40, 47; 307/46, 48, 80, 85, 86; 363/89, 126

[56] References Cited

U.S. PATENT DOCUMENTS

| | | | |
|---|---|---|---|
| 4,384,321 | 5/1983 | Rippel | 363/89 |
| 4,386,308 | 5/1983 | Emile, Jr. et al. | 307/48 |
| 4,441,031 | 4/1984 | Moriya et al. | 307/46 |
| 4,451,773 | 5/1984 | Papathomas et al. | 307/48 |
| 4,488,057 | 12/1984 | Clarke | 307/46 |
| 4,575,640 | 3/1986 | Martin | 307/86 |
| 4,714,868 | 12/1987 | Maruyama et al. | 320/40 |

FOREIGN PATENT DOCUMENTS 1496294 12/1977 United Kingdom.
2172416A 9/1986 United Kingdom.

Primary Examiner—Peter S. Wong
Attorney, Agent, or Firm—Sughrue, Mion, Zinn, Macpeak & Seas

[57] ABSTRACT

Whether electronic equipment is being used or a secondary battery is being charged is detected by measuring the electric current supplied from an electric power source to the electronic equipment. The voltage level supplied to the electronic equipment is switched corresponding to the detected result. Accordingly, the secondary battery can be charged reliably and efficiently at a higher voltage level than that used by the electronic equipment and the heat generated within the electronic equipment can be reduced. Therefore, the apparatus can be made compact and the cost thereof can be reduced. Further, the constructional parts to which the voltage from the electric power source is supplied can be operated by desirable operational characteristics.

8 Claims, 3 Drawing Sheets

ELECTRIC POWER SOURCE USED TO CHARGE A SECONDARY POWER SOURCE

BACKGROUND OF THE INVENTION

The present invention relates to an electric power source for supplying electric power to portable electronic equipment for home use, etc.

Portable electronic equipment such as a VTR or an integral type camera, an electronic still camera, etc., normally uses a battery as an electric power source so that the electronic equipment may be used outdoors. This battery is often a chargeable secondary battery which may be reused. Such electronic equipment is constructed such that the electronic equipment can also be operated by a direct current voltage provided by rectifying a commercial alternating current power source output from an electric power source such as an AC adapter, etc., within a house in which a commercial power source is disposed so as to reduce the consumption of the battery as much as possible. When the electronic equipment is not used, the secondary battery is charged using this electric power source.

In the electronic equipment, since respective circuits, constructional means, etc. are designed with the voltage output from the secondary battery as a reference voltage, it is desirable that the voltage output from the electric power source apparatus is equal to the output voltage of the secondary battery to operate the electronic equipment.

On the other hand, to charge the secondary battery, it is necessary that the voltage output to the secondary battery from the electric power source is greater than the output voltage of the secondary battery.

In a conventional electric power source a voltage greater than the voltage of the secondary battery is constructed to be output to charge the secondary battery. As a result, when the electronic equipment is operated by the output of the electric power source, a stabilizing electric power source circuit disposed within the electric equipment and stabilizing and outputting the direct current voltage from the electric power source to the respective circuits and the constructional means generates heat by the change in efficiency of this stabilizing electric power source circuit. Therefore, it is necessary to take measures such as a construction in which radiation fins are disposed in the electronic equipment, thereby increasing the size of the apparatus.

Further, it is necessary for a large electric current to flow through the stabilizing electric power source circuit, thereby changing the operational characteristics of constructional parts such as a motor, a solenoid, etc. to which the voltage provided before the stabilization of this circuit (i.e., the voltage from the electric power source) is supplied. Accordingly, it is difficult to accurately perform servo control with respect to these constructional parts.

To overcome this problem, it is considered that the output voltage of the electric power source is set to a value as close to a rated output voltage of the secondary battery as possible. However, in this case, it is difficult to efficiently charge the secondary battery.

SUMMARY OF THE INVENTION

To overcome the problems mentioned above, an object of the present invention is to provide an electric power source for effectively charging the secondary battery and preventing heat radiation within the electronic equipment and accurately enabling servo control.

With the above object in mind, the present invention relates to an electric power source for supplying a direct current voltage to electronic equipment having a secondary battery for supplying power to respective constructional circuits and means, etc. A charge circuit charges the secondary battery. A constant voltage circuit converts an alternating voltage to a direct current voltage and outputs a constant direct current voltage to the electronic equipment. A detecting circuit detects the electric current supplied to the electronic equipment equipment and the constant voltage circuit outputs at least two constant direct current voltages having different voltage values in response to an output of the detecting circuit.

The value of the electric current supplied to the electronic equipment from the electric power source when the electronic equipment is being used is different from when the secondary battery is being charged. The using and charging states are automatically detected using the electric current value. Thus, the output voltage of the electric power source is changed depending on whether the electronic equipment is being used or the secondary battery is being charged.

Accordingly, the secondary battery can be charged reliably and the heat irradiated within the apparatus can be reduced, and the apparatus can be made compact. Further, accurate servo control can be realized in the apparatus.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENT

Figure 1:
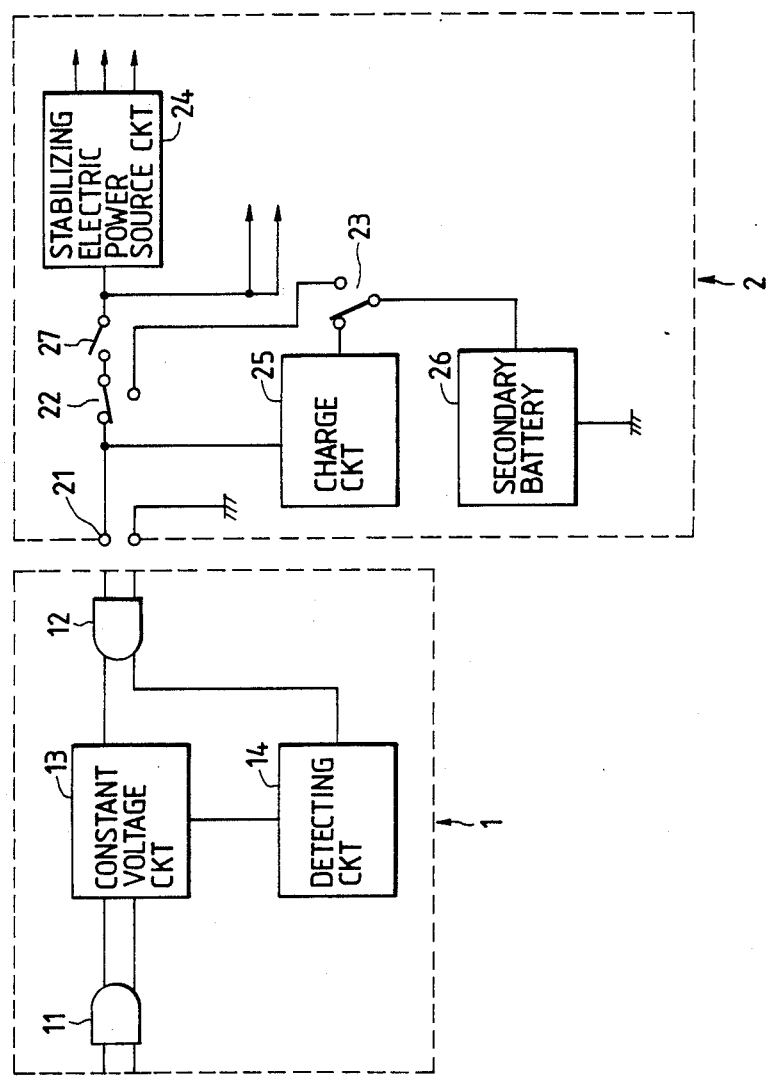
FIG. 1 is a block diagram of an electric power source and an electronic circuit in accordance with an embodiment of the present invention.

FIG. 1 shows electronic equipment and an electric power source according to the present invention. In this figure, electric power source 1 has plug 11 connected to an outlet of a commercial power source and plug 12 connected to terminal 21 of electronic equipment 2. Constant voltage circuit 13 converts a commercial alternating current voltage (e.g., 100 V) to a predetermined direct current voltage and outputs this converted voltage. Detecting circuit 14 detects an electric current supplied from electric power source 1 to electronic equipment 2, that is, a return current from an electronic equipment when the plug 12 is connected to the terminal 21.

Switch 22 is switched to the upper position shown in FIG. 1 when electronic equipment 2 is operated using electric power source 1. Switch 22 is switched to the lower position when electronic equipment 2 is operated using secondary battery 26. Switch 23 is switched to the right-hand or left-hand position in association with the turning-on or turning-off operations of electric power source switch 27, respectively. Charge circuit 25 charges secondary battery 26 using a constant electric current (including a quasi-constant electric current), for example. Stabilizing electric power source circuit 24 stabilizes a direct current voltage from electric power source switch 27 and outputs the stabilized voltage to respective constructional circuits and means, etc.

Figure 2:
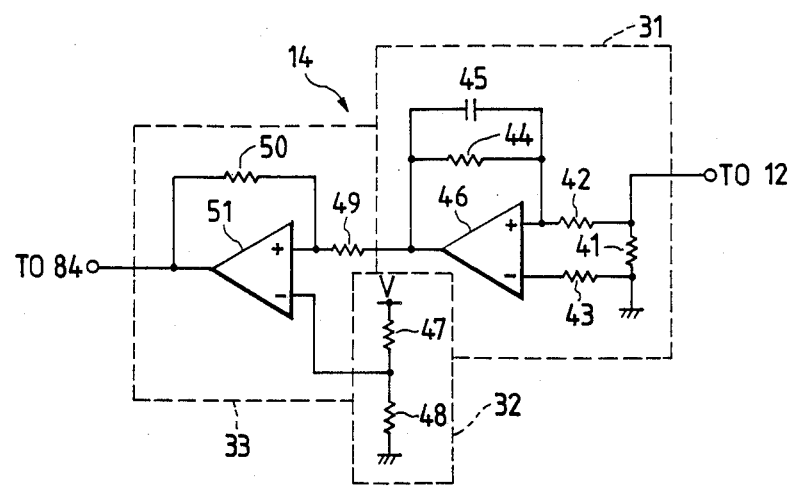
FIG. 2 is a circuit diagram of a detecting circuit used in the apparatus of the present invention.

As shown in FIG. 2 for example, detecting circuit 14 is constructed of current-voltage converting circuit 31, reference voltage generating circuit 32 and comparing circuit 33. Current-voltage converting circuit 31 is constituted by resistors 41 to 44, capacitor 45 and operational amplifier 46. Reference voltage generating circuit 32 is constituted by resistors 47 and 48, and comparing circuit 33 is constituted by resistors 49 and 50 and operational amplifier 51.

Figure 3:
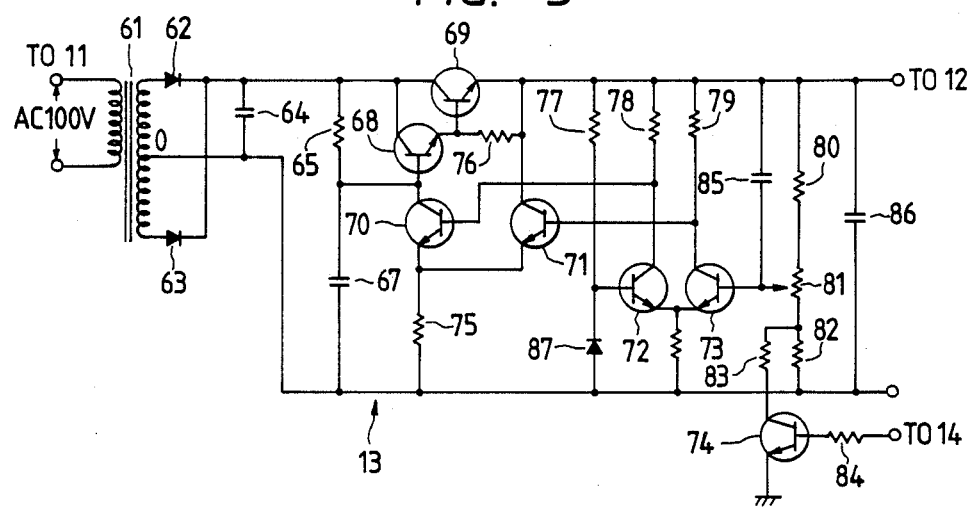
FIG. 3 is a circuit diagram of a constant voltage circuit used in the apparatus of the present invention.

As shown in FIG. 3, for example, constant voltage circuit 13 is constituted by transformer 61, diodes 62, 63, capacitors 64, 67, 85, 86, resistors 65, 75 to 84, NPN transistors 68 to 74 and Zener diode 87.

Figure 4:
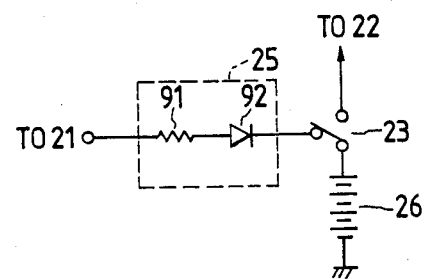
FIG. 4 is a circuit diagram of a charge circuit used in the apparatus of the present invention.

As shown in FIG. 4, for example, charge circuit 25 is constituted by a quasi-constant current charging circuit composed of resistor 91 and diode 92.

The operation of the electric power source will next be described with reference to the drawings. When plug 12 of electric power source 1 is not connected to terminal 21, switch 22 is switched to the lower position shown in FIG. 1. When power switch 27 is turned on, switch 23 is switched to the right-hand position shown in FIG. 1. Thus, a direct current voltage output by secondary voltage source 26 is input to stabilizing electric power source circuit 24 through switches 23, 22 and power switch 27. Stabilizing electric power source circuit 24 stabilizes the input voltage and outputs this stabilized voltage to respective constructional circuits and means, etc. A portion of the voltage output from power switch 27 is supplied to constructional parts requiring a large electric current such as a motor, a solenoid, etc., before this voltage portion is input to stabilizing electric power source circuit 24.

Thus, electronic equipment 2 can be operated using the electric power supplied from secondary battery 26.

When plug 12 is connected to terminal 21, switch 22 is switched to the upper position. Accordingly, when power switch 27 is turned on, the output voltage of electric power source 1 supplied from terminal 21 is output to stabilizing electric power source circuit 24 and the respective constructional parts through switch 22 and power switch 27.

In electric power source 1, a commercial alternating voltage input from plug 11 is supplied to the primary side of transformer 61 of constant voltage circuit 13 (see FIG. 3). Transformer 61 lowers this voltage on the secondary side thereof and outputs this lowered voltage. The lowered voltage is rectified by diodes 62 and 63 with respect to plus and minus portions of the voltage signal and is further smoothed by capacitor 64. The smoothed voltage is output to plug 12 through transistor 68 which has a base connected to capacitor 67 for ripple an through Darlington- connected transistor 69.

The output voltage is partially divided by resistors 80, 81 and 82 and is compared with a reference voltage set by Zener diode 87 by a comparing circuit composed of NPN transistors 72 and 73 differentially connected at two stages and NPN transistors 70 and 71. An error signal indicating the difference between these voltages is supplied to the base of NPN transistor 70 from the collector of NPN transistor 72. NPN transistor 70 controls the operation of Darlington-connected NPN transistors 68 and 69 so that the output voltage becomes a constant voltage corresponding to the reference voltage.

Figure 5:
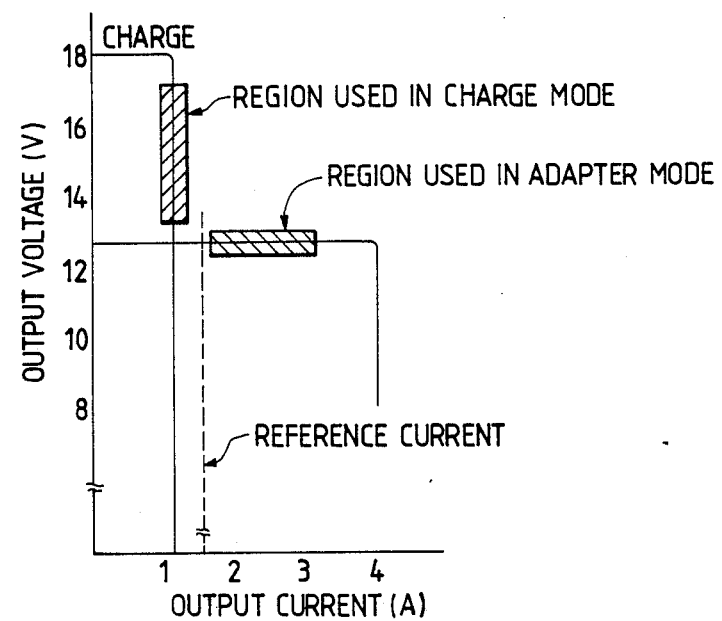
FIG. 5 is a graph showing the operational characteristics of the electric power source apparatus of the present invention.

A return electric current from electronic equipment 2 input from plug 12 flows through resistor 41 of detecting circuit 14 (see FIG. 2). A voltage corresponding to this electric current is generated in a terminal of resistor 41 which has a slight resistance value. This voltage is amplified by an inverted amplifier constituted by operational amplifier 46 and is input to comparing circuit 33. Comparing circuit 33 compares this voltage with a reference voltage generated by reference voltage generating circuit 32. The reference voltage is provided by partially dividing a predetermined voltage V using resistors 47 and 48. As shown in FIG. 5, when electronic equipment 2 is used, the electric current consumed is greater than the electric current consumed in the electronic equipment when the electric current is used to charge secondary battery 26. Current-voltage converting circuit 31 inverts and amplifies the voltage corresponding to this electric current so that its output voltage is lower when the electronic equipment is being used than when the secondary battery is being charged. The reference voltage in reference voltage generating circuit 32 is set to a value between the voltage corresponding to the electric current when the electronic equipment is being used and the voltage corresponding to the electric current when the secondary battery is being charged. Accordingly, when electronic equipment 2 is used, comparing circuit 33 outputs a signal at a low voltage level. As a result, NPN transistor 74 remains turned off and resistor 83 is not connected in parallel to resistor 82 so that the combined resistance of resistors 81 and 82 becomes large. The partially divisional ratio of voltage by resistors 80, 81 and 82 to the base of NPN transistor 73 becomes large so that the reference voltage of Zener diode 87 is relatively lowered and the voltage output from the emitter of NPN transistor 69 becomes a relatively low constant voltage (a voltage approximately equal to the output voltage of secondary battery 26).

On the other hand, when power switch 27 is turned off and plug 12 is connected to terminal 21, no electric power is supplied to the constructional parts such as stabilizing electric power source circuit 24, the motor, the solenoid, etc. Further, at this time, switch 23 is switched to the left position shown in FIG. 1. Therefore, the voltage supplied from plug 12 is input to secondary battery 26 through resistor 91, diode 92 and switch 23 (see FIG. 4). Since resistor 91 has a relatively large resistance value, the electric current flowing through this resistor approximately becomes a constant electric current (a quasi-constant electric current) and this constant electric current is used to charge secondary battery 26.

As shown in FIG. 56, the value of the electric current (the value of the electric current consumed in secondary battery 26) supplied to electronic equipment 2 (secondary battery 26) from electric power source 1 when the secondary battery is being charged is smaller than when the electronic equipment is being used. Accordingly, when the second battery is being charged, the output of comparing circuit 33 attains a high voltage level, which is opposite to that of the above-mentioned case. Accordingly, NPN transistor 74 of constant voltage circuit 13 is turned on. Since resistor 83 is then connected in parallel to resistor 82, the combined resistance value thereof becomes smaller than the resistance value in the case in which only resistor 82 is connected. Accordingly, the voltage output from the emitter of NPN transistor 69 becomes a constant voltage greater than the output voltage of secondary battery 26. As a result, secondary battery 26 is charged reliably and efficiently.

It is preferable to perform the charging operation using the constant electric current mentioned above when a nickel-cadmium battery, for example, is used as secondary battery 26. When a lead battery is used as secondary battery 26, for example, it is preferable to perform the charging operation using a constant voltage, and the present invention can also be applied to such a case.

What is claimed is:

1. An electric power source for supplying a direct current voltage to electronic equipment having a battery which is charged by said electric power source, said electric power source comprising:
    first means for detecting an electric current supplied to the electronic equipment from said electric power source; and
    second means for adjusting an output voltage of said electric power source to one of at least two different voltages in accordance with the amount of said detected current.

2. An electronic power source as claimed in claim 1, wherein one of said at least two voltages is used to power an electronic device in said electronic equipment.

3. An electronic power source as claimed in claim 1, wherein a first of said at least two voltages is used to charge said battery.

4. An electronic power source as claimed in claim 3, wherein said first voltage is higher than a second of said at least two voltages.

5. An electronic power source as claimed in claim 4, wherein said second voltage is used to power an electronic device in said electronic equipment.

6. An electronic power source as claimed in claim 1, wherein said battery is a nickel-cadmium battery.

7. An electronic power source as claimed in claim 1, wherein said battery is a lead battery.

8. An electronic power source as claimed in claim 1, wherein said second means further comprises means for converting an alternating current voltage to a direct current voltage and said at least two voltages are constant direct current voltages.

* * * * *